United States Patent [19]
Pivar

[11] 3,997,649
[45] Dec. 14, 1976

[54] METHOD OF ROTATIONAL MOLDING A HOLLOW ARTICLE

[75] Inventor: Stewart Pivar, Muttontown, N.Y.

[73] Assignee: Rototron Corporation, Farmingdale, N.Y.

[22] Filed: Nov. 29, 1971

[21] Appl. No.: 202,976

Related U.S. Application Data

[63] Continuation-in-part of Ser. No. 84,503, Oct. 27, 1970, Pat. No. 3,703,348, which is a continuation of Ser. No. 724,802, April 29, 1968, abandoned.

[52] U.S. Cl. .............................. 264/310; 264/318; 264/331; 264/334
[51] Int. Cl.² .......................................... B29C 5/04
[58] Field of Search .......... 264/334, 114, 125, 310, 264/311, 331, 318

[56] References Cited
UNITED STATES PATENTS

| | | | |
|---|---|---|---|
| 1,146,385 | 7/1915 | Aylsworth | 264/311 X |
| 2,826,869 | 3/1958 | Lerch | 264/311 X |
| 2,862,806 | 12/1958 | Nestor | 264/311 X |
| 3,217,078 | 11/1965 | Kleiber | 264/310 |
| 3,301,925 | 1/1967 | Engel | 264/310 X |
| 3,337,662 | 8/1967 | Spencer | 264/310 X |
| 3,455,483 | 7/1969 | Inklaar | 264/310 |
| 3,507,950 | 4/1970 | Barnett et al. | 264/310 |
| 3,514,508 | 5/1970 | Shott et al. | 264/310 X |

*Primary Examiner*—Willard E. Hoag
*Attorney, Agent, or Firm*—Roberts & Cohen

[57] ABSTRACT

Method for molding a hollow plastic article using a mold having an axis of rotation which is disposed during one phase of the molding operation in horizontal attitude. The mold has an opening symmetrically disposed about this axis, which opening is of a size to enable the removal of the molded article from the mold when molding is completed. A charge-retaining member is provided in association with the mold adjacent the aforesaid opening, this member being perpendicular to the aforesaid axis and defining an opening symmetrically disposed about this axis and of a size to permit the insertion of a plastic charge into the mold during its rotation. The aforesaid member can be integral with the mold or can be part of a removable cover. An elongated burner is provided extending along the mold parallel to the horizontal axis, the burner having an extent such that it does not extend beyond the charge-retaining member. Blowers are provided for blowing cooling air onto the mold and through the aforesaid openings when molding has been completed. Insofar as the associated method is concerned, the aforesaid mold can be preheated and a plastic charge inserted into the mold after this preheating, the charge being fused and thereafter cooled, the article which is formed being removed from the mold via the opening therein or via the opening in the charge-retaining member. The plastic charge is heated generally exclusively by heat passing through the mold, this heat being generally prevented from passing through either of the aforesaid openings.

13 Claims, 3 Drawing Figures

METHOD OF ROTATIONAL MOLDING A HOLLOW ARTICLE

OTHER APPLICATIONS

This application is a continuation-in-part of my co-pending application Ser. No. 84,503, filed Oct. 27, 1970, now U.S. Pat. No. 3,703,348 which in turn is a streamlined continuation application of my earlier filed application, Ser. No. 724,802, filed Apr. 29, 1968, now abandoned.

FIELD OF INVENTION

This invention relates to methods for the molding of hollow plastic articles.

BACKGROUND

The use of enclosed metal molds is well known in the art of hollow molding, particularly in the rotational molding of vinyl plastisols and polyethylene. In these methods, the molding material is introduced into the mold through an opening in the surface thereof which is then tightly closed. This mold is then subjected to multi-axial rotation while being heated either by being placed in an oven or by being placed in contact with the flames of gas burners. The molding material is cured due to its contact with the hot interior walls of the mold. The fact that the mold is completely enclosed prevents the material from spilling out during rotation and excessively hot air from the heating medium is prevented from entering the mold and coming into contact with the yet uncured molding material and the heat accumulating in the air within the mold is thought to help effect the curing of the inside surface of the molding material.

Provisions are made in the above-described system to equalize the pressure inside the mold which is caused to change by the expansion and subsequent contraction of the air contained therein as the mold is heated and then cooled. Small vent holes are used for this purpose. These vents are necessarily small in size and act slowly thus necessitating that the closure of the mold be very tight and that the mold be of a generally heavy construction to withstand internal pressure and to support a clamping system to provide a tight closure. Air will otherwise pass through the closure and form a bubble or void in the molded part.

Parts molded in such molds are cooled only by the outward passage of heat through the mold walls. To hasten cooling, water is generally sprayed against the outside walls of these molds. It is known that the accelerated cooling of mold walls by contact with water causes articles made of certain rigid materials (such as high density polyethylene) to warp during the cooling phase.

SUMMARY OF INVENTION

An object of this invention is to provide an improved molding process making use of substantially open molds which provides numerous advantages and benefits to be mentioned below.

Although it has always thought to be necessary to maintain heated air inside a mold to effect the curing of the inside surface of the molded article, it has now been found that satisfactory molding can be effected using molds with large openings in them which allow the escape of internal heated air and wherein the transfer of heat is effected substantially solely by contact of the plastic with the hot mold walls. To permit the utilization of this improved technique, provisions are made to prevent spillage during rotation and to prevent heated air from entering into the inside of the mold via the opening therein. Among the advantages of the open mold are the following:

1. the opening in the mold is used during the cooling process to remove heat from within the mold thus hastening the cooling process to a degree such that water cooling is not necessary;
2. atmospheric pressure is always maintained inside the mold thus permitting a lighter and less expensive mold construction and avoiding the need for tight closures and clamps;
3. the mold can be opened more quickly and closed more quickly;
4. the mold may be constructed of thinner metal since it need not withstand pressure differentials and thereby the heat passes into and out of the molding material more quickly thus shortening the molding cycle;
5. the mold opening may be used to introduce material into the mold during the rotation and heating steps of the molding process thereby permitting the preheating of the mold before introduction of the molding material;
6. the successive introduction of materials of different color or physical properties becomes possible to creates what is known as "sandwich moldings";
7. the operator is able to observe the inside of the mold during the molding process and is thereby able to make an improved molding by being able to terminate molding at the optimum time;
8. access to the inside of the mold is useful to avoid rejects by enabling the operator to remove foreign matter observed during the molding cycle;
9. access is provided for the introduction of metal or plastic parts which are to be molded into the molded article.

To achieve the above and other of the objects of the invention, there are provided as has been noted an improved apparatus and an improved method. The improved apparatus generally comprises a mold having an axis of rotation which is disposed for at least a substantial period of the molding operation in horizontal attitude, this mold having an opening symmetrically disposed about said axis and of a size enabling removal of the article from the mold when molding is completed. There is also included in the apparatus a charge-retaining member on the mold adjacent the aforesaid opening and at least perpendicularly to said axis and defining an opening symmetrically disposed about said axis and of a size to permit the insertion of a plastic charge into the mold during rotation of the latter.

The aforesaid charge-retaining member can be integral with the mold or it can be part of a removable cover provided for the mold, this cover including the charge-retaining member and defining an opening which permits the insertion of a plastic charge as aforesaid.

In the above described apparatus, a burner may be provided which is preferably in elongated form and extends along the aforesaid mold generally parallel to the axis thereof at least when this axis is horizontal. Said burner has an extent which is limited in order not to extend beyond the aforesaid charge-retaining member.

Further, there are provided blowers or like means to blow cooling air on the mold and through the opening after fusion of the plastic charge has taken place, whereafter the article can be removed from the mold through the opening thereof.

According to the method of the invention, there are involved the steps of forming a hollow mold with an interior defining the shape of said article and with an opening large enough to permit removal of the article when molding is completed. Rotating this mold about a horizontal axis of rotation about which the aforesaid opening is symmetrically disposed, heating the mold while the latter is rotating to fuse a plastic charge in the mold and deposit the same over the interior of the mold, cooling the mold and the thusly formed article and removing the article via said opening from said mold.

According to another feature of the invention, the mold may be, as indicated hereinbefore, preheated while rotating and before the plastic charge is inserted.

According to another feature of the invention, the plastic charge is heated generally exclusively by heat passing through the mold, said heat being generally prevented from passing through said aforesaid openings.

According to yet another feature of the invention, the plastic charge can be monitored by visual observation taking place through the opening in the mold and/or charge-retaining member.

BRIEF DESCRIPTION OF DRAWING

The invention will be more clearly understood by reference to the accompanying drawing in which.

DETAILED DESCRIPTION

Figure 1:
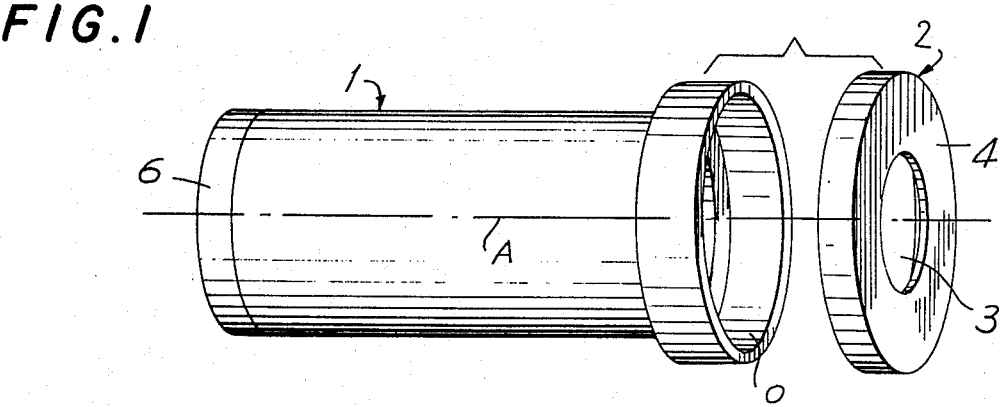
FIG. 1 is a diagrammatic view of a mold produced and employed in accordance with the invention, with the cover of the mold shown in removed posture.

The mold 1 shown in FIG. 1 consists of a metal fabrication, the internal form of which conforms to the desired external form of the part to be molded. The removable cover 2 is also fabricated of metal and in such a way as to fit snugly over the open end of the mold 1. The cover is provided with an opening 3 bounded by a powder retaining surface 4 which is sufficiently broad as to prevent the powder charge 5 from spilling out of the opening 3 when the mold is in a horizontal position. A mold mounting bracket 6 of conventional construction is the means by which the assembled mold and cover is attached to a rotational power source. Burner B shown in FIG. 2 is adapted to supply heat for heating the mold and thus the plastic material therein.

Air blowers 7 are actuated during the cooling step to blow cooling air simultaneously into the interior of the mold, through the opening 3 and against the exterior of the mold.

Figure 3:
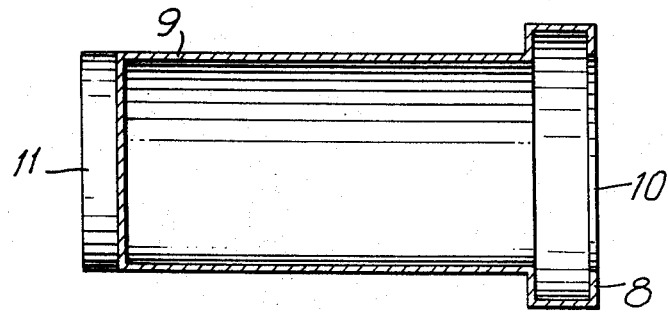
FIG. 3 is a cross-sectional view of an alternative mold using a non-removable cover.

In FIG. 3, a cross-sectional view of an alternative arrangement is shown wherein a non-removable powder retaining surface 8 is integral with the rest of the mold 9, there being an opening 10 and a bracket 11 as in the prior embodiment.

Figure 2:
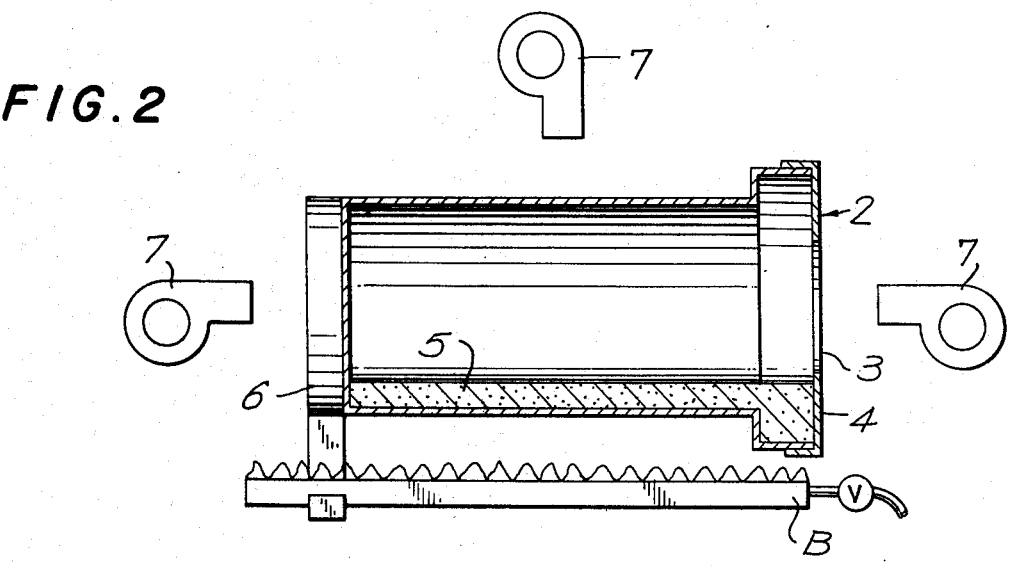
FIG. 2 is a diagrammatic cross-sectional view of the mold with the cover in place.

The making of a molded article using the process of the invention comprises the following steps with reference to FIGS. 1 and 2:

The mold 1 is mounted on a molding machine (not shown) by means of mold mounting brackets 6 which machine is capable of imparting a rotary motion to the mold about the longitudinal axis A thereof. The machine may be capable of heating the mold from beneath by a jet of hot air or the mold may be exposed to radiant or gas burner B.

Shortly after the commencement of rotation and heating, a charge of powdered thermoplastic molding material is introduced through the hole 3 in the cover 2. This powder charge 5 becomes disposed along the side wall of the mold (i.e., it is localized at the bottom with the mold in horizontal attitude as illustrated) and proceeds to fuse against the wall of the mold which is heated as indicated. When all the powder charge has been fused against the mold walls and the resultant fused mass has achieved a sufficient degree of fusion, heating is terminated. Cooling is then commenced by means of air blowers 7 which are actuated at this time causing cooling air to be directed simultaneously against the outer walls of the mold and into the opening 3. When cooling is complete the cover 4 is removed manually and the molded part is removed through the open end of the mold. The cover is then replaced and the whole operation can be repeated.

In an alternative procedure, the mold 9 can be used with its non-removable powder retaining surface 8 as shown in FIG. 3 instead of a removable cover. The hole 10 it will be noted is relatively large so that the molded part can be removed through this hole with a slight flexing of the rim or lip of the thusly formed article.

Depending on the configuration of the mold, it will be necessary to position the molding machine which supports the mold during rotation and heating in various positions to enable the powder to come in contact with all interior surfaces of the mold. The illustrated embodiments are molds for producing an open topped cylindrical container. These molds in the horizontal position shown will cause powder to contact the side walls of the mold. Contact with the bottom can be caused by shifting the machine to an angle of approximately 45° to the horizontal (see my copending application Ser. No. 202,975, filed simultaneously herewith).

The process of the invention is especially useful in the molding of open topped containers wherein it provides the additional advantage of avoiding the unnecessary initial closing of the open top which in the case of the use of closed molds is achieved by making an entirely enclosed molding and subsequently cutting out the desired opening. Containers as large as 5000 gallons have been molded using the process of this invention.

It has been found that the objects of the invention are best served by allowing the opening in the mold to be as large as possible. This facilitates the charging of the mold through its opening with a minimum of spillage of molding powder and as fast as possible. In the case of molds for articles above 20 gallons in capacity with a full open top, an opening permits the operator to have manual and visual access to any part of the interior of the mold if it is at least 12 inches in diameter. However, an opening as small as one inch in diameter is, for example, sufficient to maintain atmospheric pressure within the mold and to allow charging the mold and to permit limited visual inspection assuming such opening is large enough to permit removal of the molded article. Molds as large as several hundred gallons in capacity can advantageously be built of steel as thin as 22 gauge.

The molding apparatus used to support and heat the mold is designed so as to be capable of heating the entire outside surface of the mold without allowing any substantial amount of heat to enter the mold opening. This apparatus consists of a support means capable of imparting rotary motion to the mold about an axis perpendicular to the plane of the opening in the mold and which support means can be adjusted so that the axis of rotation is either substantially horizontal or disposed at a sufficiently large angle from the horizontal so as to cause the molding material to cover the lowermost inside surface of the mold. It has been found that the use of an angle of 45° gives good results. The preferred range of speed of rotation lies between 3 and 25 rotations per minute. The preferred heating means is an elongated gas burner which is disposed beneath the mold during rotation. This burner is disposed adjacent the surface of the mold and is of such length that it does not pass beyond the plane of the cover. In this way, no substantial amount of heat rising from the burner can enter into the opening in the cover.

Referring again to the drawing, it is seen from the above that the invention provides an apparatus for molding a hollow plastic article, which apparatus comprises a mold having an axis of rotation A which is disposed for at least a substantial period of the molding operation in a horizontal attitude. The mold 1 has an opening O which is symmetrically disposed about this axis and which is of a size which enables the removal of the article from said mold when molding is complete. With respect to this opening and to the mold, the element 4 constitutes a charge-retaining member which is disposed on the mold adjacent the opening O and which is at least generally perpendicular to the axis A. The charge-retaining member also defines an opening as stated hereinabove, which is the opening 3, which is symmetrically disposed about the axis A and which is of a size to permit the insertion of a plastic charge into the mold during rotation of the latter.

According to FIG. 1, the charge-retaining member is part of a removable cover 2. According to FIG. 3, the charge-retaining member is integral with the mold.

It will be noted, as indicated hereinabove, that the burner B is an elongated burner extending along the mold generally parallel to the axis A at least when this axis is horizontal, and it will be further noted that the burner has an extent which is limited such that it does not extend beyond the charge-retaining member, as a result of which, heating of the charge 5 within the mold is generally limited to heat passing through the mold with the charge-retaining member serving to shield the interior of the mold and prevent heat originating with the burner B from entering through the aforesaid opening into the interior of the mold.

It will also be generally observed that, in accordance with the invention, there is provided a method for molding a hollow plastic article comprising forming a hollow mold with an interior defining the shape of the article and with an opening large enough to permit removal of the article when molding is completed, the method further comprising rotating the mold about a horizontal axis of rotation about which the aforesaid opening is symmetrically disposed. Still further, the method involves heating the mold while the latter is rotating to fuse a plastic charge in the mold and deposit the same on the interior of the mold, cooling the mold and the thusly formed article, and removing the article via the aforesaid opening from the mold.

As has been noted hereinabove, the mold can preferably be preheated while rotating and before the plastic charge is inserted. As has also been noted hereinabove, the plastic charge is heated generally exclusively by heat passing through the mold, this heating being generally prevented from passing through the aforesaid opening or openings.

There will now be obvious to those skilled in the art many modifications and variations of the structures and methods set forth hereinabove. Such modifications and variations will not depart from the scope of the invention if defined by the following claims.

What is claimed is:

1. The method for molding a hollow plastics article, comprising: introducing a substantial part of a fusible powdered plastics charge into a rotary mold, said mold having an opening in an end thereof symmetrical with respect to said end, said mold end having an annular retaining ring secured thereto partially closing said open end, an opening in said annular ring providing access to the interior of said mold and an exit for said article from said mold, said plastics charge and said article being such that said article is removable through said opening, rotating said mold about a horizontal axis of rotation about which said opening is symmetrically disposed, heating said mold, with the mold interior communicating horizontally with ambient atmosphere through said opening while said mold is rotating, to fuse the plastics charge in the mold and distribute said charge on the interior surface of said mold, heating said charge only through walls of said mold; cooling said mold and the charge therein, to form said article, by simultaneously blowing cooling air on the mold outer walls and through said opening into the mold interior and removing said article from the mold through said opening.

2. A method as claimed in claim 1 wherein the mold is rotated at about 3–25 R.P.M.

3. A method as claimed in claim 1 wherein the cooling medium is air which is blown through said opening.

4. A method as claimed in claim 1 wherein the article is provided with a varying diameter.

5. A method as claimed in claim 1 wherein the mold is preheated while rotating and before the plastic charge is inserted.

6. A method as claimed in claim 1 wherein the opening is a minimum of 12 inches in diameter.

7. A method as claimed in claim 1 where at least a substantial part of the plastic charge is introduced at one time and the mold is provided adjacent said opening with a charge retaining surface provided with a size sufficient to retain the charge before the charge is deposited on the interior of the mold, the mold being rotated at about 3–25 R.P.M., the cooling medium being air which is blown through said opening, the article being provided with a varying diameter, the mold being displaceable from horizontal to inclined positions and being heated from below, the mold being heated by a source of heat which moves with the mold between the horizontal and inclined positions, said surface being used to prevent the entry of heat into the interior of the mold via said opening.

8. A method as claimed in claim 1 wherein the mold is displaced from horizontal to inclined positions and is heated from below.

9. A method as claimed in claim 8 wherein the mold is heated by a source of heat which moves with the mold between the horizontal and inclined positions.

10. A method as claimed in claim 1 wherein the mold is provided adjacent said opening with a charge retaining surface provided with a size sufficient to retain the charge before the charge is deposited on the interior of the mold.

11. A method as claimed in claim 10 wherein said surface is used to limit the entry of heat into the interior of the mold via said opening.

12. A method as claimed in claim 10 wherein the surface is arranged to be removable from the mold.

13. A method as claimed in claim 10 wherein the surface is arranged to be fixed to the mold.

* * * * *